United States Patent [19]

Boegli et al.

[11] Patent Number: 4,800,977

[45] Date of Patent: Jan. 31, 1989

[54] CONTROL SYSTEM FOR DRIVING AND STEERING DRIVERLESS TRANSPORT DEVICES

[75] Inventors: Peter Boegli, Studer; Jörg Buser, Biel, both of Switzerland

[73] Assignee: JD-Technologie AG, Zug, Switzerland

[21] Appl. No.: 88,598

[22] Filed: Aug. 24, 1987

Related U.S. Application Data

[63] Continuation of Ser. No. 759,749, Jul. 29, 1985, abandoned.

[30] Foreign Application Priority Data

Aug. 10, 1984 [CH] Switzerland ........................ 3847/84

[51] Int. Cl.[4] ........................ B60K 26/00; B62D 1/24

[52] U.S. Cl. .................................. 180/168; 180/131; 318/310; 318/587; 364/424.02

[58] Field of Search ............... 180/168, 167, 6.2, 6.48, 180/6.5, 6.44, 131, 79.1; 318/587, 625, 310, 329; 364/436, 444, 445, 447, 424

[56] References Cited

U.S. PATENT DOCUMENTS

| | | | |
|---|---|---|---|
| 4,078,630 | 3/1978 | Krieg | 180/168 |
| 4,127,182 | 11/1978 | Thole | 180/168 |
| 4,307,329 | 12/1981 | Taylor | 318/587 |
| 4,520,299 | 5/1985 | Konrad | 318/587 |

FOREIGN PATENT DOCUMENTS

| | | | |
|---|---|---|---|
| 2555365 | 6/1977 | Fed. Rep. of Germany . | |
| 2165335 | 8/1973 | France . | |
| 2353426 | 12/1977 | France . | |
| 1440672 | 6/1976 | United Kingdom | 180/168 |
| 2028032 | 2/1980 | United Kingdom | 318/587 |

*Primary Examiner*—David M. Mitchell
*Assistant Examiner*—Everett G. Diederiks, Jr.
*Attorney, Agent, or Firm*—Werner W. Kleeman

[57] ABSTRACT

Each transport device contains at least two drive wheels which are driven at individual speeds $V_A$ and $V_B$ and which are pivotable by related steering angles $\alpha$ and $\beta$. Identical servo-drive units are associated with the drive wheels and their mode of operation and mutual coupling is adapted by switch devices to the steering angles $\alpha$ and $\beta$ such that the required speed adjustment must not be computed in accordance with the relationship $V_B=(\cos\alpha/\cos\beta)$. $V_A$ but the speed is automatically adjusted through the entire steering angle range of $-90°$ to $+90°$. At $\alpha=\beta=0°$ the leading servo-drive unit is rigidly guided by its speed regulation loop as a MASTER servo-drive unit and its armature current is supplied as a reference magnitude to the armature current regulation loop of the trailing servo-drive unit which is operated as a SLAVE servo-drive unit. At $\alpha=\beta=\pm 90°$ the two servo-drive units operate as independent MASTER servo-drive units and their speed regulation loops receive related reference speed signals from related microcomputers. Throughout the steering angle range of $-90°$ to $+90°$ the MASTER/SLAVE configuration and the MASTER/MASTER configuration are selectively used depending on the operating conditions and the travel durations. The optimum adaption of the servo-drive units to the steering angles and the limitation of the speed to the maximum speed which corresponds to optimum efficiency, insure precise track guidance, improved maneuverability and minimum current consumption.

12 Claims, 5 Drawing Sheets

DRIVE MODULE MICROCOMPUTER
22
22'
CURRENT REGULATOR PI
19
19'
LINE DRIVER
LINE RECEIVER
27
28
27'
28'
37
36
36'
PULSE WIDTH MODULATOR
25
25'
DIGITAL SPEED REGULATOR PID
18
18'
18.1
18.2
16
16'
14
14'
15
15'
24
24'
26
26'
13
13'
29
29'
PULSE RATE DIGITAL CONVERTER
21
21'
SWITCHING POWER AMPLIFIER
ARMATURE CURRENT PROCESSING CIRCUIT
12
12'
SERVO-DRIVE UNIT
6
6'
$V_{ref}$
$I_{ref}$
$I_{act}$
17
17'

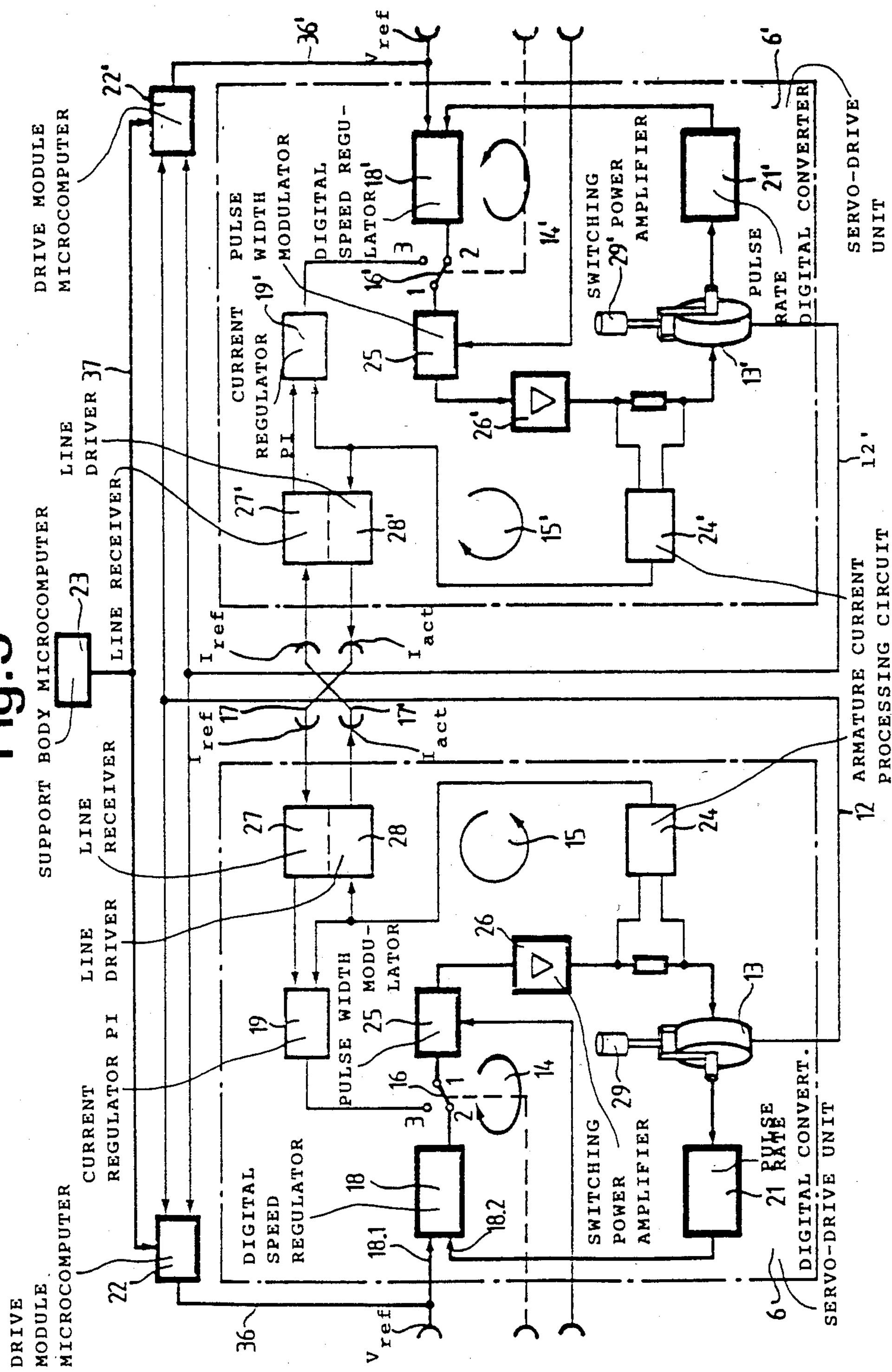
Fig.5
DRIVE MODULE MICROCOMPUTER
22'
36'
$V_{ref}$
6'
SERVO-DRIVE UNIT
DIGITAL CONVERTER
PULSE RATE
21'
SWITCHING POWER AMPLIFIER
29'
13'
PULSE WIDTH MODULATOR
DIGITAL SPEED REGULATOR
18'
3
2
1
16'
14'
25
19'
CURRENT REGULATOR PI
26'
LINE DRIVER
37
LINE RECEIVER
27'
28'
15'
24'
12'
ARMATURE CURRENT PROCESSING CIRCUIT
SUPPORT BODY MICROCOMPUTER
23
$I_{ref}$
$I_{act}$
17
17'
12
24
15
27
28
LINE RECEIVER
LINE DRIVER
26
13
19
CURRENT REGULATOR PI
PULSE WIDTH MODULATOR
25
16
14
29
SWITCHING POWER AMPLIFIER
DIGITAL SPEED REGULATOR
18
18.1
18.2
21
PULSE RATE
DIGITAL CONVERT.
SERVO-DRIVE UNIT
6
22
DRIVE MODULE MICROCOMPUTER
36
$V_{ref}$

CONTROL SYSTEM FOR DRIVING AND STEERING DRIVERLESS TRANSPORT DEVICES

CROSS-REFERENCE TO RELATED APPLICATION

This application is a continuation application of our copending U.S. application Ser. No. 06/759,749, filed July 29, 1985 and entitled "CONTROL SYSTEM FOR DRIVING AND STEERING DRIVERLESS TRANSPORT DEVICES, now abandoned"

BACKGROUND OF THE INVENTION

The present invention relates to a new and improved construction of a control system for driving and steering a driverless transport device.

In its more particular aspects, the present invention specifically relates to a new and improved construction of a control system for driving and steering a driverless transport device which contains at least two drive wheels as well as additionally a predetermined number of free-wheeling support wheels. Each one of the drive wheels is provided with a vertical steering axle and is pivotable through predetermined steering angles by means of the steering axle. A predetermined one of the at least two drive wheels is freely controllable with respect to its drive speed.

Driving and steering control systems of the aforementioned type can be generally used for driving and steering driveable objects like, for example, during the guided or dead reckoning travel of trackless vehicles in automatic floor-level conveyor installations.

There are known driving and steering control systems for driverless transport devices in which individually driven drive wheels are arranged for pivoting about a vertical axis. Thus, there has been described by the Assignee of the present invention, for example, in German Pat. No. 2,555,365 a steering control system for remotely controlled transport devices each of which comprises two drive wheels $R_A$ and $R_B$ and, if desired, additional free-wheeling supporting wheels. The drive wheels $R_A$ and $R_B$ are respectively driven at drive speeds $V_A$ and $V_B$. Each of the drive wheels is steered by means of a guiding or directing line which determines respective drive wheel steering angles $\alpha$ and $\beta$. The steering angles $\alpha$ and $\beta$ designate the angles which are formed between the running or travel directions of the respective drive wheels $R_A$ and $R_B$ and an interconnecting line extending through the steering axles of the drive wheels. For this purpose an antenna is associated and pivotable with each drive wheel. The antenna scans an electric guiding or directing cable and thereby pivots the associated drive wheel by means of a steering motor in such a manner that the antenna is continuously located above the guiding or directing track and guides the drive wheel along the guiding or directing track.

The drive speed $V_A$ of a predetermined drive wheel $R_A$ then is freely controllable via the guiding or directing cable and the antenna by means of a master control unit, while the drive speed $V_B$ of the other drive wheel $R_B$ is controlled in accordance with the relationship $$V_B=(\cos \alpha/\cos \beta).V_A \quad \text{(I)}$$

One substantial disadvantage of a drive system designed in such a manner results from the circumstance that in transport devices of the aforementioned type the economically acceptable expense for the driving and steering control is limited. Therefore, the drive speeds generally cannot be adjusted to each other in relation to the associated steering angles with the required precision. In order to satisfy the relation (I) which represents a law of nature, therefore, electrical and mechanical balancing mechanisms positively develop in the system and such electrical and mechanical balancing mechanisms, particularly at high speeds and in extreme driving positions, disadvantageously affect the operation and maintenance of such transport devices. In the presently described control system the two wheel drives, in fact, operate as parts or members of independent speed regulators. Upon the occurrence of differences between the speeds projected onto the longitudinal axis of the transport device, the total drive torque is non-uniformly distributed over the two wheel drives in correspondence with the elasticity or flexibility of the individual regulating characteristics. In an extreme case this may result in the two wheel drives counteracting each other, i.e. that the transport device is driven by only one motor while the other motor operates in the manner of a generator and brakes the transport device. Evidently there results therefrom an unnecessarily increased current consumption which is considered particularly disadvantageous because of the battery-powered current supply.

Furthermore, the different torques result in additional structural stresses and unequal wear of the drive motors, transmissions and wheel tires or rims. The track guiding precision is detrimentally affected thereby and there is also impaired the maneuverability, particularly during controlled travel like, for example, with the assistance of a stored table for controlling the travel. As a consequence, such transport devices are rendered more difficult to operate and are considerably more expensive to maintain.

Further substantial disadvantages result from the circumstance that in the previously suggested transport system the maximum permitted steering angles $\alpha$ and $\beta$ between the running directions of the drive wheels and the interconnecting line through their vertical steering axles, must be smaller than $+90°$ and $-90°$. The mechanically available pivoting range of the drive wheels extends from $-90°$ to $+90°$ and thus cannot be fully utilized for the reasons of the control technique. It is of particular disadvantage in the known control system that the steering angles of $+90°$ and $-90°$ are not available, so that interesting driving or traveling modes like, for example, "turning on location" must be dispensed with. The mobility and maneuverability is thereby restricted and additionally the guiding or directing tracks cannot be laid in a freely selectable manner.

SUMMARY OF THE INVENTION

Therefore, with the foregoing in mind, it is a primary object of the present invention to provide a new and improved construction of a control system for driving and steering a driverless transport device in which at least two drive wheels are pivotable by steering angles in the range of $-90°$ to $+90°$ and can be individually steered and driven without controlling their drive speed according to the relation $V_B=(\cos \alpha/\cos \beta).V_A$.

Another important object of the present invention aims at the provision of a new and improved construction of a control system for driving and steering a driverless transport device and which control system can be used throughout the full pivoting range of the drive wheels from $-90°$ to $+90°$ and which is optimized with respect to the operation in the extreme positions in which each of the steering angles has the value of 0°, −90°, +90° and in which the steering angles have the values of +90° and −90°.

Still a further significant object of the present invention is directed to a new and improved construction of a control system for driving and steering a driverless transport device and which control system is tolerant against mechanical and electrical asymmetries between the individual wheel drives and ensures precise track guidance during guided travel as well as during dead reckoning travel.

Now in order to implement these and still further objects of the invention, which will become more readily apparent as the description proceeds, the control system of the present development is manifested by the features that, the at least two pivotable drive wheels are provided with identical servo-drive units each of which comprises an electromotor, a speed regulation loop, an armature current regulation loop and a switch device. By means of the switch device each servo-drive unit can be adapted to the associated steering angle with respect to its configuration and mode of operation.

In a MASTER/SLAVE configuration which is optimized for each steering angle being equal to 0°, the leading master servo-drive unit operates in the manner of a motor-driving speed regulation loop which produces an armature current. This armature current is coupled as a current reference magnitude to at least one trailing slave servo-drive unit which is operated in the manner of a motor-driving armature current regulation loop. The speed reference value of the master servo-drive unit is controlled by means of the steering angles in such a manner that the drive speed of at least one trailing slave servo-drive unit is smaller than or equal to the maximum speed.

In a MASTER/MASTER configuration which is optimized for steering angles of +90° and −90°, the two servo-drive units are operated independently of each other in the manner of motor-driving speed regulation loops.

The inventive control system provides a driving and steering control system for trackless transport devices which offers a number of advantages.

One of the advantages is that the relation $V_B=(\cos\alpha/\cos\beta).V_A$ must not be calculated in order to adjust the drive speeds in relation to the steering angles $\alpha$ and $\beta$ and thus the hardware expense and the software expense therefor is eliminated. The construction of the inventive driving and steering control system is thereby simplified and considerably less expensive with respect to manufacture and maintenance. Due to the elimination of this calculating method there are also eliminated the speed deviations which occur as a result of insufficient precision of the calculation and which have negative effects like increased current consumption, imprecise track guidance and additional structural stresses.

Further advantages result from the fact that by means of the inventive driving and steering system the drive wheels can be operated throughout the entire pivot range from −90° to +90° and that the wheel drive is at an optimum in the extreme positions at steering angles $\alpha$ and $\beta$ equal to 0°, −90° or +90°. This enables the use of novel travelling modes and courses of movement which fundamentally improves the maneuverability and mobility of transport devices which are driven by means of the inventive control system. There results therefrom a wider freedom in establishing the traveling tracks which thus can be better adapted to spatial and operative conditions.

It has proven particularly advantageous that in the MASTER/SLAVE configuration the adaptation of the slave-wheel to the master-wheel in terms of speed which adaptation is given by the aforementioned relation (I), automatically occurs due to the course of movement or travel and that no special devices or measures are required for this purpose. This automatic speed adjustment is obtained directly by means of the floor contact of the two drive wheels and, therefore, this speed adjustment is continuously adapted to changing operating conditions like unequal wear of the wheel tires or rims. There is thus achieved a substantial improvement in the operating reliability of transport devices which are driven by means of the inventive control system.

The MASTER/SLAVE configuration is further characterized in that the servo-drive units which are regulated with respect to equally high armature currents, are very smoothly and elastically or flexibly coupled with respect to their speeds. For an automatic speed adjustment of the two drive wheels there are thus required only small forces which are reliably transferred also at large steering angles due to the adhesive friction between the wheel tires and the floor. Therefore, slip and structural stresses are only insignificantly increased due to the automatic speed adjustment and thus the favorable track guidance is not impaired. Otherwise the combination or configuration is insensitive to differences in the wheel drives such as, for example, unequal motor torques, unequal transmission resistances or unequal wheel diameters. The MASTER/SLAVE configuration accordingly is enabled to tolerate wheel drives which are non-symmetric with respect to torque, and to automatically adapt to wear-caused variations in the drive speeds. It should be apparent that the manufacture and maintenance of transport devices which are equipped with the inventive driving and steering control system are substantially facilitated and their price is substantially reduced.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

Figure 1:
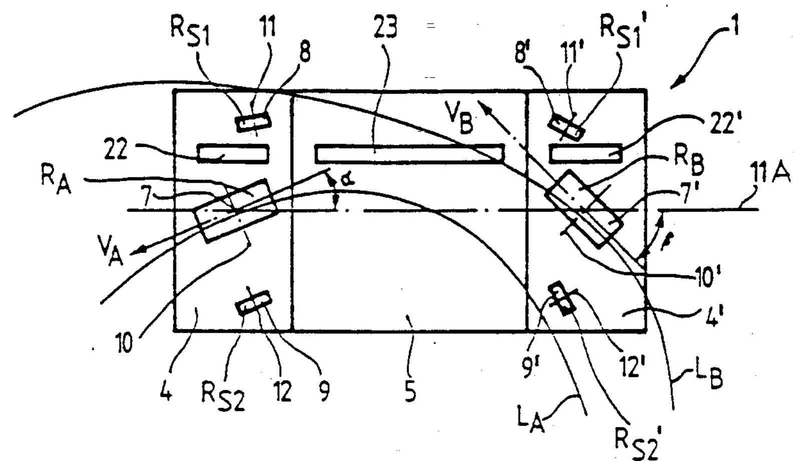
FIG. 1 is a schematic plan view showing the disposition and wheel arrangement in a transport device equipped with an exemplary embodiment of the inventive driving and steering control system.
Figure 3:
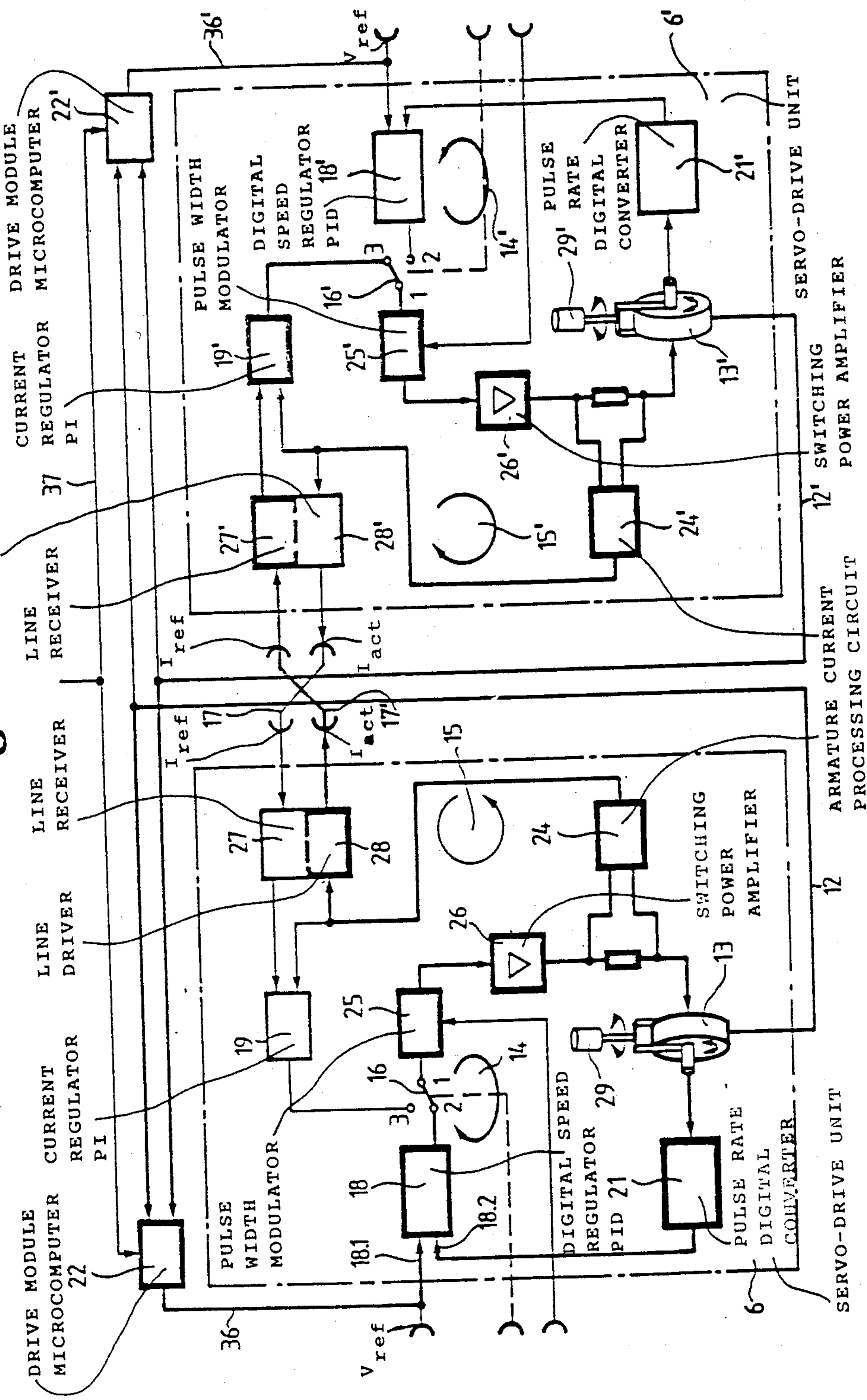
FIG. 3 is a schematic block circuit diagram of the inventive driving and steering control system in a MASTER/SLAVE configuration and used in the transport device illustrated in FIG. 1.
Figure 4A:
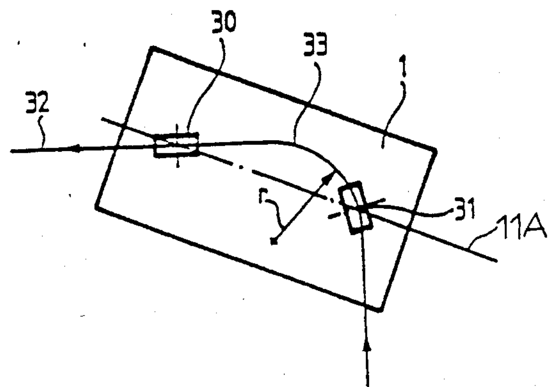
Figure 4B:
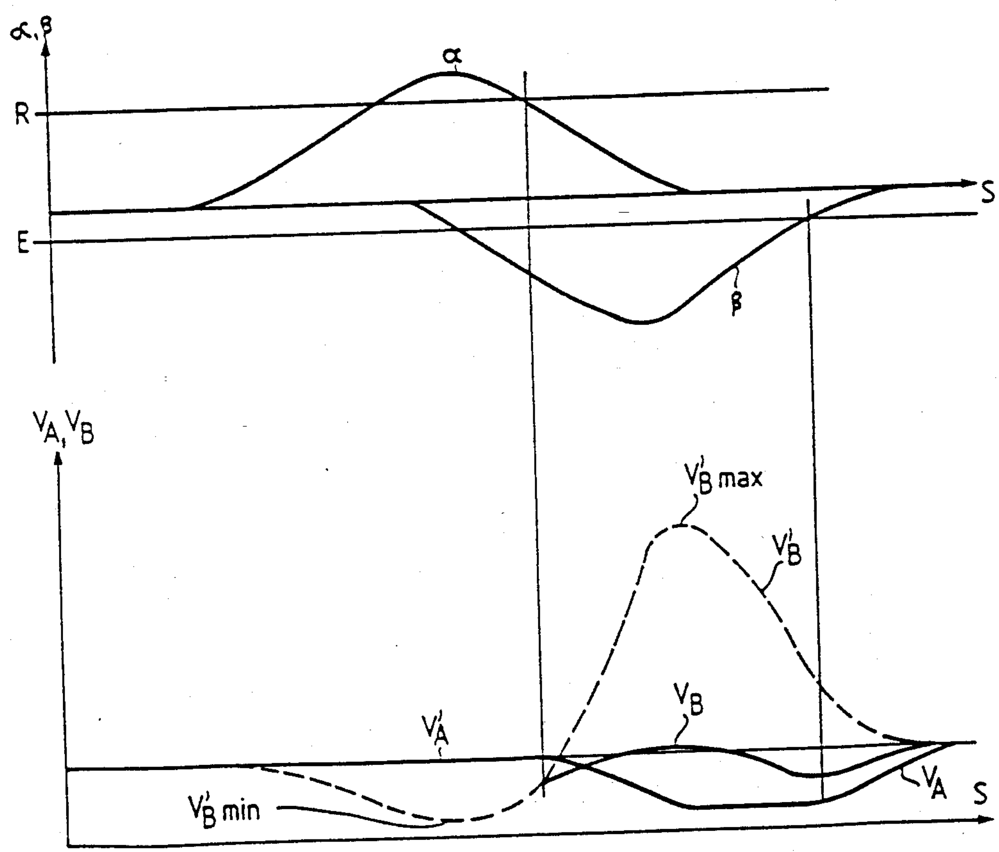
Figure 6:
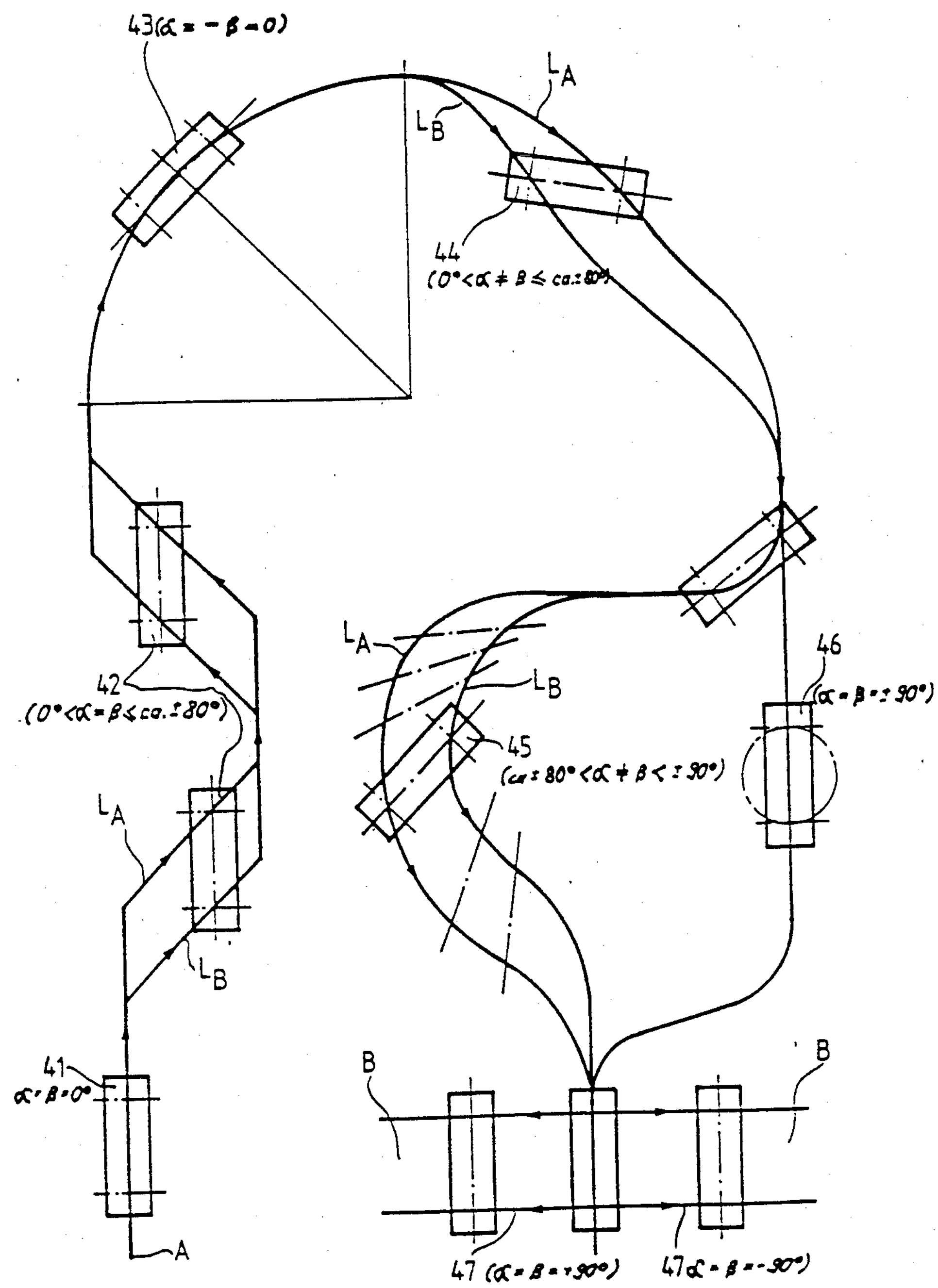

FIG. **4*a* is a schematic plan view and illustrates the conditions during the passage through a curve of the transport device illustrated in FIG. 1 and equipped with the inventive control system in the MASTER/SLAVE configuration shown in FIG. 3**;

FIG. 4*b* is a diagram showing the distance-dependent variations of the steering angles α and β and the variation of the drive speeds $V_A$ and $V_B$ during passage through the curve illustrated in FIG. 4*a*;

FIG. 5 is a schematic block circuit diagram showing the inventive driving and steering control system in a MASTER/MASTER configuration and used in the transport device shown in FIG. 1; and FIG. 6 is a schematic diagram showing a possible track guidance with various characteristic traveling modes for the MASTER/SLAVE configuration and MASTER/MASTER configuration of the inventive driving and steering control system used in the transport device illustrated in FIG. 1.

DETAILED DESCRIPTION OF THE PREFERRED EMBODIMENTS

Describing now the drawings, it is to be understood that only enough of the construction of the driving and steering control system has been shown as needed for those skilled in the art to readily understand the underlying principles and concepts of the present development, while simplifying the showing of the drawings. Turning attention now specifically to FIG. 1, there has been schematically illustrated an exemplary embodiment of a driverless transport device 1 which is driven by the inventive driving and steering control system of which an exemplary embodiment is illustrated and described further hereinbelow.

In the illustrated exemplary embodiment the inventive driving and steering control system is described for use with the automatic operation of a floor-level conveyor installation. However, such control system is generally applicable to transport devices in the storing or warehousing and conveying industry as well as for automatically displacing constructional elements from which constructional units can be assembled.

The transport device 1 comprises two separate and complete drive modules or cells 4 and 4' which are connected to a load-carrying connection member or support body 5 in a mirror-image relationship. Each drive module or cell 4 and 4' substantially contains a respective steerable drive wheel $R_A$ or $R_B$ with a respective driving and steering servo-drive unit 6 and 6' (cf. FIG. 3). A predetermined number of supporting wheels are provided and the illustrated exemplary embodiment contains two respective supporting wheels $R_{S1}$ and $R_{S2}$ as well as $R_{S1}'$ and $R_{S2}'$. Drive module or cell microcomputers 22 and 22', one for each drive module or cell 4 and 4', respectively, are provided for controlling and monitoring the traveling speed, the steering angle as well as safety devices and other facilities which are not specifically illustrated in FIG. 1.

All of the three wheels $R_A$, $R_{S1}$, $R_{S2}$ and $R_B$, $R_{S1}'$, $R_{S2}'$ associated with each drive module or cell 4 and 4' are pivotably mounted at the bottom side of the transport device 1 for pivoting about related vertically extending steering axles 7, 8, 9 and 7', 8', 9', respectively. All of these three wheels of each drive module or cell 4 and 4' are mounted for rotation about a horizontal axis in associated wheel bearings or suspensions. The steering axles 7, 8, 9 and 7', 8', 9' are arranged in a mutually spaced relationship and the steering axles 7 and 7' extend through the related rotational axes 10 and 10' of the associated drive wheels $R_A$ and $R_B$. The supporting wheels $R_{S1}$ and $R_{S2}$ as well as $R_{S1}'$ and $R_{S2}'$ are constructed in a self-steering manner with steering axles 8, 9 and 8', 9' which extend in a spaced relationship from the respective rotational axes 11, 12 and 11', 12'.

The drive wheels $R_A$ and $R_B$ can be pivoted in a motor-operated manner about the associated steering axles 7 and 7' by means of the inventive driving and steering control system. The drive wheels $R_A$ and $R_B$ are driven in a manner which will be explained in more detail hereinafter. Although in the exemplary embodiment illustrated in FIG. 1 the two drive wheels $R_A$ and $R_B$ are arranged on the central longitudinal axis 11A of the transport device 1, a diagonal or any other suitable arrangement likewise can be used in combination with the inventive driving and steering control system.

The steering angles formed between the running or traveling direction of the two drive wheels $R_A$ and $R_B$ and the common central longitudinal axis 11A of the transport device 1 are respectively designated by the reference characters α and β. In the case that the drive wheels $R_A$ and $R_B$ are not arranged at the central longitudinal axis of the transport device 1, the steering angles are formed between the running or traveling direction of the respective drive wheels and an interconnecting line which extends through the rotational centers of the drive wheels.

The support body 5 contains a support body microcomputer 23 for the dominate controlling and monitoring operations as well as not particularly illustrated load receiving means and a battery-powered energy supply.

Figure 2:
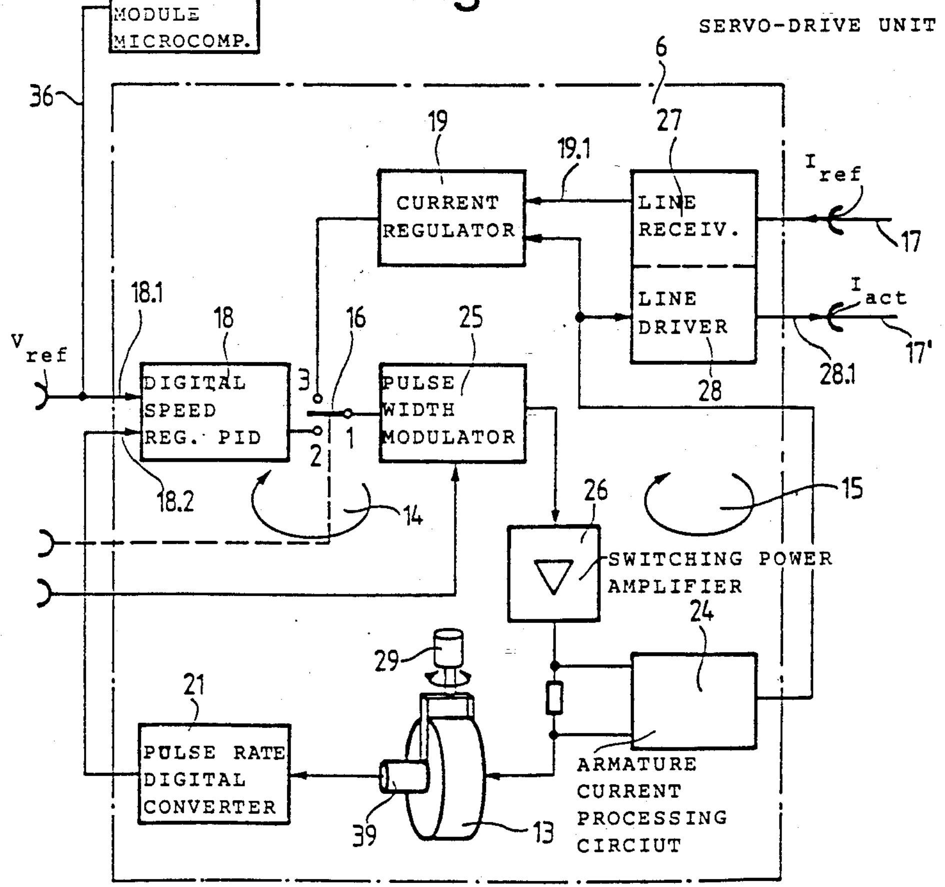
FIG. 2 is a schematic block circuit diagram and shows the basic construction of a servo-drive unit in the transport device illustrated in FIG. 1.

For driving each one of the drive wheels $R_A$ and $R_B$ there is provided a servo-drive unit 6 of the type as illustrated in FIG. 2. In the presently illustrated exemplary embodiment the servo-drive unit 6 is digitally structured and substantially comprises a speed regulation or control loop 14 and an armature current regulation or control loop 15. By means of a switch device 16 the speed regulation or control loop 14 and the armature current regulation or control loop 15 are selectively switchable for different modes of operation and configurations in a motor-driving manner to a permanent magnet-excited d.c.-electromotor 13. The switch device 16 thus adjusts the associated servo-drive unit 6 with regard to its modes of operation and configurations to predetermined values of the steering angle of the associated drive wheel. There is further provided a switching power amplifier 26 which is controlled by a pulse width modulator 25. The switching power amplifier 26, the pulse width modulator 25 and the switch device 16 are series connected and are common to the speed regulation or control loop 14 and the armature current regulation or control loop 15.

The speed regulation or control loop 14 is closed by means of a pulse-rate digital converter 21 as well as by means of a digital speed regulator 18 (PID-type) which is quantized with respect to time and amplitude and which possesses constant coefficients. A reference speed signal input 18.1 of the speed regulator 18 is connected to the microcomputer 22 of the associated drive module or cell 4.

The armature current regulation or control loop 15 is closed by means of an armature current processing circuit 24 and a current regulator 19 of PI-type. A current reference signal input 19.1 of the current regulator 19 is connected via a line receiver 27 and a data line 17 which may constitute, for example, a serial data line, with the servo-drive unit 6' associated with the other drive module or cell 4'. A line driver 28 is series-connected with the armature current processing circuit 24.

An output 28.1 of the line driver 28 is coupled via a data line 17' to a line receiver 27' of the servo-drive unit 6' associated with the drive module or cell 4'.

The switch device 16 for adjusting the different modes of operation and configurations can assume a MASTER position and a SLAVE position. This switch device 16 may constitute a mechanical switch, an electronic switch or a software-controlled switch device.

In order to drive the transport device 1, the two servo-drive units 6 and 6' are electrically interconnected, namely in a MASTER/SLAVE configuration which is illustrated in FIG. 3 or in a MASTER/MASTER configuration which is illustrated in FIG. 5.

The MASTER/SLAVE configuration is illustrated as a block circuit diagram in FIG. 3. In such MASTER/SLAVE configuration the speed regulation or control loop 14 of the servo-drive unit 6 is closed by means of the switch device 16. The speed reference signal is generated by the microcomputer 22 associated with the drive module or cell 4 and is supplied, either in parallel or serially, via data line 36 to the speed regulator 18. Furthermore, the armature current regulation or control loop 15' of the servo-drive unit 6' is closed by means of the switch device 16'. The current regulator 19' is connected via the data line 17' to the line driver 28 of the servo-drive unit 6 associated with the drive module or cell 4 for providing the current reference signal. Thus, the leading master servo-drive unit generates a current reference signal which is transmitted to the current regulator 19' via the data lines 17'. The speed regulation or control loop 14 independently maintains its predetermined speed. The dependent armature current regulation or control loop 15' adapts its speed in correspondence to the steering angles $\alpha$ and $\beta$. Therefore, the servo-drive unit 6 which is associated with the drive module or cell 4, operates as a MASTER servo-drive unit and the servo-drive unit 6' associated with the drive module or cell 4' operates as a SLAVE servo-drive unit and their combination or interconnection constitutes the MASTER/SLAVE configuration.

FIG. 4*a* shows the transport device 1 at the exit of a curve and, in the illustrated position of the transport device 1, the leading or master drive wheel 30 has arrived at the straight travel path 32 while the trailing slave drive wheel 31 is still located in the curved travel path 33. During the passage through such a curve there result the basic variations or courses for the steering angles $\alpha$ and $\beta$ as well as for the drive speeds $V_A$ and $V_B$ which are illustrated in FIG. 4*b* as a function of the distance S. In this illustration the variation of the speed of the trailing SLAVE servo-drive unit is designated by the reference character $V_B'$ in the case that the drive speed of the leading MASTER servo-drive unit is maintained constant at the speed designated by the reference character $V_A'$. The extreme values of the $V_B'$ curve obey the following relationship:

$$\frac{V_B' \max}{V_A'} = \frac{V_A'}{V_B' \min} = k \quad \text{(II)}$$

The super elevation factor k is a function of the shape of the curve which is traveled through plus a wheel base length immediately forwardly of and immediately after the traveled-through curve as well as a function of the traveled-through curve radius and the wheel base of the transport device 1. For simple 90°-curves with straight inbound and outbound travel paths the following relationship is valid in approximation:

$$k \approx \frac{l}{r} \quad \text{(III)}$$

Therein, l designates the wheel base of the transport device 1 and r the traveled-through curve radius.

In the illustration of FIG. 4*b* the variation of the speed of the trailing slave servo-drive unit 6' is designated by the reference character $V_B$. This speed variation results in the case that the speed of the leading MASTER servo-drive unit varies according to $V_A$ as in the inventive driving and steering control system which is explained in more detail hereinbelow with reference to the description of its mode of operation.

The MASTER/MASTER configuration is illustrated as a block circuit diagram in FIG. 5. In such MASTER/MASTER configuration the speed regulation or control loops 14 and 14' of the two servo-drive units 6 and 6' are closed by means of the related switch devices 16 and 16'. Thus, the two speed regulation or control loops 14 and 14' are connected in a motor-driving manner to the associated d.c.-electromotors 13 and 13'. The data lines 36 and 36' respectively connect the two speed regulators 18 and 18' with the associated microcomputers 22 and 22' of the related drive modules or cells 4 and 4'. Via a common synchronization line 37 the two microcomputers 22 and 22' receive the same reference speed signal from the microcomputer 23 which is associated with the support body 5. Since the two speed regulation or control loops 14 and 14' independently of each other maintain the same drive speeds $V_A$ and $V_B$, each one of the two servo-drive units 6 and 6' operates as a MASTER servo-drive unit and their interconnection or combination via the common synchronization line 37 represents the aforementioned MASTER/MASTER configuration.

The inventive driving and steering control system enables novel traveling modes and seven particularly characteristic traveling modes are illustrated in FIG. 6. Such traveling modes either as a single traveling mode or in combination enable a multitude of movements and maneuvers. As will be explained in the description of the mode of operation in more detail hereinbelow, it is preferable due to the type of used servo-drive units, to differentiate between the traveling modes in accordance with the magnitude of the two steering angles $\alpha$ and $\beta$.

A first group of traveling modes encompasses the angle range $0 \leqq \alpha, \beta \leqq$ about $\pm 80°$. The following types of movement are associated with this steering angle range:

(i) straight travel along the longitudinal axis 11A of the transport device 1; $\alpha = \beta = 0°$; see 41 in FIG. 6;

(ii) straight travel at an angle with respect to the longitudinal axis 11A of the transport device 1; $0° < \alpha = \beta \leqq$ about 80°; see 42 in FIG. 6;

(iii) circular travel at any selected radius with the center of the circle on the symmetry axis; $\alpha = -\beta \neq 0 \leqq$ about 80°; see 43 in FIG. 6;

(iv) curve travel at any desired radius of curvature and center of curvature; $0° < \alpha \neq \beta \leqq$ about 80°; see 44 in FIG. 6.

A second group of traveling modes encompasses the steering angle range of about $\pm 80° < \alpha, \beta \leqq \pm 90°$. The following traveling modes are associated with this steering angle range:

(i) curved travel at any desired radius of curvature and center of curvature; about $\pm 80° < \alpha \neq \beta < \pm 90°$; see 45 in FIG. 6;

(ii) turning on location; $\alpha = -\beta = \pm 90°$; see 46 in FIG. 6;

(iii) straight travel transverse to the longitudinal axis 11A of the transport device 1; $\alpha = \beta = \pm 90°$; see 47 in FIG. 6.

In order to explain the mode of operation of the inventive driving and steering control system reference is made to FIGS. 1 to 6 and it will be assumed in such explanation, that a multitude of transport devices 1 are drivable between stations along a network of travel paths in an automatic floor-level conveying installation, for example, for assembling a constructional unit from its construction elements. For steering the transport device 1 illustrated in FIG. 1, the steerable drive wheels $R_A$ and $R_B$ are pivoted in known manner by means of their related vertical steering axles 7 and 7' using an associated steering motor. The continuous input of the steering angles $\alpha$ and $\beta$ which is required therefor, is obtained according to at least two different procedures:

(i) In a guided manner of travel each drive wheel $R_A$ and $R_B$ follows related predetermined guiding or directing lines $L_A$ and $L_B$ in the floor by means of a scanning device. The guiding or directing lines $L_A$ and $L_B$ can be identical for the two drive wheels $R_A$ and $R_B$. Thus the related steering angles $\alpha$ and $\beta$ are not under the control of the transport device 1 but are controlled by means of the guiding or directing lines $L_A$ and $L_B$.

(ii) In a steered manner of travel the two steering angles $\alpha$ and $\beta$ are a function of the distance which is covered and which is measured from a predetermined reference point. This function also contains information about the travel speed and is stored in the form of a travel control table in the related microcomputers 22 and 22' of the associated drive modules or cells 4 and 4'. The travel curve traveled by the transport device 1 thus is a direct and exclusive result of this travel control table.

The two servo-drive units 6 and 6' are provided for driving the associated drive wheels $R_A$ and $R_B$. Since these two servo-drive units are of identical construction, their function will be explained hereinbelow with reference to the servo-drive unit 6 illustrated in FIG. 2.

Since the permanent magnet-excited d.c.-electromotor 13 is supplied with power by a battery and since therefore efficiency considerations have highest priority, the use of the switching power amplifier 26 should be appreciated. This switching power amplifier 26 has a binary mode of operation, i.e. the switching power amplifier 26 is either completely connected through or completely blocked. The switching power amplifier 26 is controlled and analogized in a corresponding manner by the pulse width modulator 25. The speed is detected by means of an incremental encoder 39 and the output pulses of this encoder 39 are accumulated during a variable measuring period and transformed into an internal floating-point representation. The available modes of operation are MASTER, SLAVE and STAND-BY (rest). The first two of these three modes of operation are selectable by means of the switch device 16 and the last mentioned mode of operation is selectable by means of the pulse width modulator 25.

In the MASTER mode of operation the speed regulation or control loop 14 is connected to the d.c.-electromotor 13 in a motor-driving manner while the armature current regulation or control loop 15 is inactive. The leading MASTER servo-drive unit is thus operated in the manner of a motor-driving speed regulation or control loop. For this purpose the speed regulation or control loop 14 is closed via the contacts 1 and 2 of the switch device 16 which thus represents a mode of operation select switch. The speed reference signal $V_{ref}$ is input, for example, in parallel form from the associated microcomputer 22 of the related drive module or cell 4 to the input 18.1 of the digital speed regulator 18 which is quantized with respect to time and amplitude. Furthermore, the armature current of the d.c.-electromotor 13 which is driven in this manner, is measured in the armature current processing circuit 24 and then digitize. After corresponding format conversion, the digitized armature current of the d.c.-electromotor 13 is transmitted as a reference magnitude in the form of a serial telegram or message to the corresponding slave servo-drive unit. This mode of operation is realized when, for example, the leading servo-drive unit 6 forms the MASTER servo-drive unit and the trailing servo-drive unit 6' forms the SLAVE servo-drive unit.

In the SLAVE mode of operation the armature current regulation or control loop 15 is connected in a motor-driving manner with the d.c.-electromotor 13 while the speed regulation or control loop 14 is inactive. Thus the trailing SLAVE servo-drive unit is operated in the manner of an armature current regulation or control loop. For this purpose the armature current regulation or control loop 15 is closed via the contacts 1 and 3 of the switch device 16. The current reference signal $I_{ref}$ is transmitted as a reference magnitude or current in serial form from the associated MASTER servo-drive unit to the input 19.1 of the current regulator 19. This mode of operation is realized when, for example, the leading servo-drive unit 6' forms the MASTER servo-drive unit and the trailing servo-drive unit 6 forms the SLAVE servo-drive unit.

In the STAND-BY mode of operation the pulse width modulator 25 is turned off, whereby the switching power amplifier 26 is blocked and renders impossible the flow of an armature current in the d.c.-electromotor 13.

FIG. 3 shows the inventive driving and steering control system in the MASTER/SLAVE configuration which preferably is provided for small to medium steering angles $\alpha$ and $\beta$ which are smaller than or equal to about $\pm 80°$. The servo-drive unit 6 which is located in front with respect to the travel direction, is rigidly commanded in the MASTER mode of operation in the manner of a speed regulation or control loop. The armature current of this leading MASTER servo-drive unit 6 is provided as a reference magnitude or current via the armature current processing circuit 24 and the data line 17' to the servo-drive unit 6' which is located at the rear with respect to the travel direction and which is control loop as the trailing SLAVE servo-drive unit. The rotational speed of the trailing SLAVE servo-drive unit 6' and thus $V_B$ is self-adjusted in such a manner that the two d.c.-electromotors 13 and 13' take up the same current. This means that the two d.c.-electromotors 13 and 13' share in halves the required drive torque, whereby the current consumption and wear are automatically minimized. The trailing SLAVE servo-drive unit 6' thus not only receives a predetermined armature current which is predetermined by the leading MASTER servo-drive unit 6 but also operates at the predetermined speed $V_B$ which is continuously adapted to the drive speed $V_A$ of the leading MASTER servo-drive unit 6 in correspondence with the steering angles $\alpha$ and $\beta$ by means of the floor contact of the two drive wheels $R_A$ and $R_B$. 6'.

In the MASTER/SLAVE configuration the speed adjustment of the two servo-drive units 6 and 6' is given by the relation $V_B=(\cos\alpha/\cos\beta).V_A$ due to their mechanical coupling via the floor contact of the drive wheels $R_A$ and $R_B$. It is also clearly apparent from this relation that this coupling is at an optimum for the steering angles $\alpha=\beta=0°$ and becomes increasingly weaker as the steering angles $\alpha$ and $\beta$ approach $\pm 90°$. In the extreme position in which the steering angles are $\alpha=\beta=\pm 90°$ this mechanical coupling has completely disappeared and the MASTER/SLAVE drive concept is inoperable. Thus the MASTER/SLAVE configuration is optimized for straight travel at the steering angles $\alpha=\beta=0°$ and its operability diminishes with increasing steering angles $\alpha$ and $\beta$. Preferably, therefore, the MASTER/SLAVE configuration is used in an angle range from 0° to a maximum angle which is predetermined by the deployment of the transport device 1 and which, for example, may amount to about $\pm 80°$. As will be explained hereinafter with reference to FIG. 5, starting from these maximum or limiting steering angles $\alpha_G$ and $\beta_G$, the two servo-drive units 6 and 6' are operated not in the MASTER/SLAVE configuration, but preferably in a MASTER/MASTER configuration.

A special case results for the MASTER/SLAVE configuration during exit from a curve when, as illustrated in FIG. 4a, the curve radius or radius of curvature is smaller than about half of the wheel base of the transport device 1. In this case the steering angle $\alpha$ is small as compared to the steering angle $\beta$ and, therefore, the drive speed $V_B$ is high as compared to the drive speed $V_A$. Under these conditions the drive speed $V_B$ which is predetermined by the drive speed $V_A$, can be greater than the allowable maximum drive speed. Wheel drives which are operated close to their optimum efficiency, which is important because the consumed current is drawn from a battery, however, are not capable of delivering a multiple of their standard drive speed which is designated $V_A'$ in FIG. 4b. It is therefore required to reduce the drive speed of the leading MASTER servo-drive unit 6 during the passage through curves in such a manner that the trailing SLAVE servo-drive unit 6' can remain in its regular operating range also at the exit from the curve. It is also important that this deceleration of the transport device 1 occurs at moderate values since the deceleration forces are superimposed upon centrifugal forces and this may result in undesirable effects like load displacements or track loss.

The driving and steering control system, therefore, must contain means which in due time anticipate an impending excessive drive speed of the trailing SLAVE servo-drive unit and transiently cause the leading MASTER servo-drive unit to operate at a lower speed. For this purpose the values of the steering angle $\alpha$ are supplied to the microcomputer 22 or 22', as the case may be, of the leading drive module or cell 4 or 4' by means of related steering angle transmitters 29 and 29' and associated data lines 12 and 12'. The speed reference signal for the respectively associated leading servo-drive unit is then reduced and later increased again as a function of the steering angle $\alpha$ in the following manner:

After the transport device 1 has passed approximately through one half of the curve, the steering angle $\alpha$ of the leading MASTER servo-drive unit decreases again. When this steering angle $\alpha$ falls below a predetermined steering angle value R, the drive speed $V_A$ of the leading MASTER servo-drive unit is gradually reduced in such a manner that the drive speed $V_B$ of the trailing SLAVE servo-drive unit remains within the allowable limit. When now the steering angle $\beta$ of the trailing SLAVE servo-drive unit drops below a predetermined steering angle value E at the exit from the curve, the drive speed $V_A$ of the leading MASTER servo-drive unit is gradually re-increased to the original value, provided the following relationship is satisfied at this moment of time:

$$\alpha \leq E \qquad \text{(IV)}$$

When the condition (IV) is observed, problems are avoided which otherwise would occur during the passage through interconnected S-shaped curves. Preferably, the two predetermined steering angle values R and E are calculated by computer simulation as a function of the curve geometry, the wheel base, permitted acceleration values and deceleration values as well as the speed reserve of the servo-drive units. In general, these two predetermined steering angle values R and E are constant within a given transport or conveying installation.

As already mentioned hereinbefore, the MASTER/SLAVE configuration is operable only up to predetermined limiting steering angles $\alpha G$ and $\beta G$ due to a decrease in the mechanical coupling via the two drive wheels $R_A$ and $R_B$. At greater angles the servo-drive units 6 and 6' are therefore operated in the manner of motor-driving speed regulation or control loops and combined or interconnected to form the MASTER/MASTER configuration which is illustrated in FIG. 5.

Contrary to the MASTER/SLAVE configuration, the MASTER/MASTER configuration is based on the precondition that the two servo-drive units 6 and 6' are not or as little as possible mechanically coupled by means of the floor contact of the drive wheels $R_A$ and $R_B$. The MASTER/MASTER configuration thus is optimized for transverse travel at the steering angles of $\alpha=\beta=\pm 90°$ and its operability decreases with decreasing steering angles $\alpha$ and $\beta$. Its deployment preferably extends to the steering angle range $\alpha_G,\beta_G<\alpha, \beta \leq \pm 90°$. The two configurations, namely the MASTER/SLAVE configuration and the MASTER/MASTER configuration, excellently supplement each other with respect to the steering angles $\alpha$ and $\beta$, so that during the use of the inventive driving and steering control system the full pivoting range of the drive wheels $R_A$ and $R_B$ from $-90°$ to $+90°$ can be continuously covered in an optimum manner.

A typical course of movement is shown in FIG. 6 in order to illustrate the mobility and maneuverability which can be achieved by employing the inventive driving and steering control system. Seven traveling modes 41 to 47 are indicated and the transport unit 1 passes along the travel path between the end points A and B along two guiding or directing lines $L_A$ and $L_B$ which may be identical. During this through-passage the transport device 1 passes through each traveling mode in a configuration or drive configuration which is optimumly suited therefor, namely the traveling modes 41 to 44 in the MASTER/SLAVE configuration and the traveling modes 45 to 47 in the MASTER/MASTER configuration. There thus occurs a continuous adjustment of the drive to the course of movement which results in a travel distinguished by ' track retention, minimum current consumption and small mechanical stress of the transport device 1.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A control system for driving and steering a driverless transport device, comprising:

at least two drive wheels;

a predetermined number of free-wheeling support wheels;

each one of said at least two drive wheels being provided with a substantially vertically extending steering axle and being pivotable by predetermined steering angles through means of said steering axle;

a predetermined one of said at least two drive wheels being freely controllable with respect to its drive speed;

said at least two drive wheels being provided with essentially identical servo-drive units;

each said servo-drive unit comprising a d.c.-electromotor, a speed regulation loop, an armature current regulation loop and a switch device;

each said servo-drive unit assuming a preselectable configuration and mode of operation;

said switch device adapting said configuration and said mode of operation of its associated servo-drive unit to predetermined values of said steering angle of its associated one of said at least two drive wheels;

said at least two drive wheels comprising a leading drive wheel and a predetermined number of trailing drive wheels;

said switch devices associated with the related servo-drive units of said leading drive wheel and of said trailing drive wheels, adapting said configuration and mode of operation of their associated servo-drive units such that a MASTER/SLAVE configuration is formed which constitutes an optimum configuration at predetermined values of said steering angles of said leading and trailing drive wheels;

said servo-drive unit operatively associated with said leading drive wheel, in said MASTER/SLAVE configuration, constituting a leading MASTER servo-drive unit and being operated in the manner of a motor-driving speed regulation loop;

said leading MASTER servo-drive unit generating an armature current;

said servo-drive units operatively associated with said predetermined number of trailing drive wheels, in said MASTER/SLAVE configuration, constituting a predetermined number of trailing SLAVE servo-drive units each of which is operated in the manner of a motor-driving armature current regulation loop and to each of which said armature current generated by said leading MASTER servo-drive unit is coupled as a reference current;

means for generating a reference speed signal and feeding said reference speed signal to said leading MASTER servo-drive unit; and said reference speed signal being controlled by said steering angles such that at least one of said predetermined number of trailing SLAVE servo-drive units assumes a predetermined drive speed which is smaller than or equal to a maximum value of the drive speed.

2. The control system as defined in claim 1, wherein: said predetermined angles each have a value of about 0°.

3. The control system as defined in claim 1, further including:

a drive module associated with said leading drive wheel and containing a microcomputer;

a predetermined number of angle transmitters each of which is associated with a related one of said predetermined number of trailing SLAVE servo-drive units;

data lines interconnecting said predetermined number of angle transmitters and said microcomputer of said drive module associated with said leading drive wheels;

said microcomputer constituting said means for generating said reference speed signal and gradually reducing said reference speed signal supplied to said leading MASTER servo-drive unit when the associated steering angle falls below a predetermined value in order to limit the drive speed of said predetermined number of trailing SLAVE servo-drive units; and said microcomputer gradually increasing said reference speed signal supplied to said leading MASTER servo-drive unit when the non-associated steering angle, which is associated with at least one of said predetermined number of trailing drive wheels, falls below a predetermined value and is greater than said associated steering angle, in order to limit said drive speed of said predetermined number of trailing SLAVE servo-drive units.

4. The control system as defined in claim 3, further including:

means for individually determining, for each said transport device, said predetermined value of the associated steering angle and said predetermined value of the non-associated steering angle as a function of curve geometry, wheel base length, allowable deceleration and acceleration as well as speed reserve.

5. The control system as defined in claim 4, wherein: said predetermined value of the associated steering angle and said predetermined value of the non-associated steering angle are individually determined for each said transport device by means of computer simulation.

6. The control system as defined in claim 1, wherein:

each one of said leading MASTER servo-drive unit and said trailing SLAVE servo-drive unit assuming a drive speed adapted to a maximum drive speed corresponding to essentially optimum efficiency;

at least one of said drive speeds assuming a value which is at least equal to said maximum drive speed; and each one of said two drive speeds being continuously equal to or smaller than said maximum drive speed.

7. A control system for driving and steering a driverless transport device, comprising:

at least two drive wheels;

a predetermined number of free-wheeling support wheels;

each one of said at least two drive wheels being provided with a substantially vertically extending steering axle and being pivotable by predetermined steering angles through means of said steering axle;

a predetermined one of said at least two drive wheels being freely controllable with respect to its drive speed;

said at least two drive wheels being provided with essentially identical servo-drive units;

each said servo-drive unit comprising a d.c.-electromotor, a speed regulation loop, an armature current regulation loop and a switch device;

each said servo-drive unit assuming a preselectable configuration and mode of operation;

said switch device adapting said configuration and said mode of operation of its associated servo-drive unit to predetermined values of said steering angle of its associated one of said at least two drive wheels;

said switch devices associated with the related servo-drive units of said at least two drive wheels, adapting said configuration and mode of operation of their associated servo-drive units such that a MASTER/MASTER configuration is formed which constitutes an optimum configuration at predetermined values of about ±90° for said steering angles of said at least two drive wheels;

each said MASTER servo-drive unit operatively associated with one of said at least two drive wheels constituting a motor-driving speed regulation loop; and said MASTER servo-drive units being operated independently of each other.

8. The control system as defined in claim 7, wherein:

each one of said MASTER servo-drive units assuming a drive speed adapted to a maximum drive speed corresponding essentially to optimum efficiency;

at least one of said drive speeds assuming a value which is at least equal to said maximum drive speed; and each one of said two drive speeds being continuously equal to or smaller than said maximum drive speed.

9. A control system for driving and steering a driverless transport device, comprising:

at least two drive wheels;

a predetermined number of free-wheeling support wheels;

each one of said at least two drive wheels being provided with a substantially vertically extending steering axle and being pivotable by predetermined steering angles through means of said steering axle;

a predetermined one of said at least two drive wheels being freely controllable with respect to its drive speed;

said at least two drive wheels being provided with essentially identical servo-drive units;

each said servo-drive unit comprising a d.c.-electromotor, a speed regulation loop, an armature current regulation loop and a switch device;

each said servo-drive unit assuming a preselectable configuration and mode of operation;

said switch device adapting said configuration and said mode of operation of its associated servo-drive unit to predetermined values of said steering angle of its associated one of said at least two drive wheels;

a predetermined number of drive modules each of which contains a related one of said servo-drive units;

each said drive module comprising a microcomputer;

said microcomputer generating a reference speed signal;

each said speed regulation loop being operatively associated with a related one of said predetermined number of drive modules;

each said speed regulation loop containing a pulse rate digital converter and being closed by means of a speed regulator; and data lines interconnecting each said microcomputer and said speed regulator of said speed regulation loop operatively associated with the related drive module and supplying said reference speed signal to said speed regulator.

10. The control system as defined in claim 9, wherein:

said reference speed signal is supplied by said microcomputer in parallel form and via said data lines to said speed regulator.

11. The control system as defined in claim 9, wherein:

said speed reference signal is serially supplied by said microcomputer via said data lines to said speed regulator.

12. A control system for driving and steering a driverless transport device, comprising:

at least two drive wheels;

a predetermined number of free-wheeling support wheels;

each one of said at least two drive wheels being provided with a substantially vertically extending steering axle and being pivotable by predetermined steering angles through means of said steering axle;

a predetermined one of said at least two drive wheels being freely controllable with respect to its drive speed;

said at least two drive wheels being provided with essentially identical servo-drive units;

each said servo-drive unit comprising a d.c.-electromotor, a speed regulation loop, an armature current regulation loop and a switch device;

each said servo-drive unit assuming a preselectable configuration and mode of operation;

said switch device adapting said configuration and said mode of operation of its associated servo-drive unit to predetermined values of said steering angle of its associated one of said at least two drive wheels;

said at least two drive wheels constituting only two drive wheels;

each said steering angle of said two drive wheels assuming a steering angle range of −90° to +90° inclusive of the steering angles −90° and +90°; and said two servo-drive units operatively associated with said two drive wheels, depending on the operating conditions and the travel duration of the associated transport device, selectively assuming either one of a MASTER/SLAVE configuration wherein the MASTER servo-drive unit is associated with the leading one of said two drive wheels and the SLAVE servo-drive unit is associated with the trailing one of said two drive wheels, or a MASTER/MASTER configuration wherein each said servo-drive unit operates independently of the other.

* * * * *